(12) United States Patent
Pakura

(10) Patent No.: US 7,213,781 B2
(45) Date of Patent: May 8, 2007

(54) CUTTERHEAD

(75) Inventor: Franz Pakura, Fahrenholz (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/301,545

(22) Filed: Dec. 13, 2005

(65) Prior Publication Data

US 2006/0130452 A1    Jun. 22, 2006

(30) Foreign Application Priority Data

Dec. 18, 2004    (DE)    ...................... 10 2004 061 070

(51) Int. Cl.
*B02C 1/10* (2006.01)
*B02C 1/08* (2006.01)
*B02D 25/02* (2006.01)

(52) U.S. Cl. ...................... 241/294; 241/221; 241/242; 83/349

(58) Field of Classification Search ................ 241/294, 241/221, 242; 83/349
See application file for complete search history.

(56) References Cited

U.S. PATENT DOCUMENTS

| 3,805,660 | A |   | 4/1974  | Burrough          |         |
|-----------|---|---|---------|-------------------|---------|
| 4,061,284 | A | * | 12/1977 | Raisbeck et al.   | 241/294 |
| 4,209,137 | A | * | 6/1980  | McAllister et al. | 241/221 |
| 4,257,566 | A | * | 3/1981  | Lawrence          | 241/221 |
| 5,544,826 | A | * | 8/1996  | Klingler et al.   | 241/242 |
| 5,704,562 | A | * | 1/1998  | Wagstaff          | 241/294 |

FOREIGN PATENT DOCUMENTS

| DE | 27 37 683 A1 | 3/1978  |
|----|--------------|---------|
| DE | 27 37 684    | 2/1979  |
| DE | 88 13 953    | 2/1989  |
| EP | 0 683 971    | 11/1995 |

* cited by examiner

*Primary Examiner*—Faye Francis

(57) ABSTRACT

A cutterhead having a drum surface with a series of knife retainers distributed about the surface. The longitudinal extension of the knife retainers defines an angle α with the axis of rotation of the cutterhead, and a knife is mounted to the knife retainer. The knife is configured such that a cutting edge of the knife extends parallel to the axis of rotation.

6 Claims, 4 Drawing Sheets

CUTTERHEAD

BACKGROUND

1. Field of the Invention

The invention relates generally to forage harvesters and, more particularly to a cutterhead of a forage harvester.

2. Related Technology

Self-propelled forage harvesters are typically equipped with open or closed cutterhead having detachable knifes in order to chop picked-up crop into small pieces, which serve as fodder. Attached on the cutterhead body are knife retainers, which in turn carry the knives.

Conventional knife retainers are disposed on cutterheads parallel or at an angle to the axis of rotation of the cutterhead. Knife retainers arranged at an angle (i.e. incline) to the axis of rotation are used to perform a so-called pull-through cut with the knives attached thereon upon a rotating motion of the cutterhead. In this configuration, the cutting edges of the knives also form an angle with respect to the direction of rotation of the cutterhead that is between 90° and 0° and with respect to the edge of shear bars disposed parallel to the axis of rotation of the cutterhead. The knives, which are flat, have a leading cutting edge in the direction of rotation that extends parallel to the fastening area fixed to the knife retainer and non-parallel with respect to the axis of rotation, as described in DE 88 13 953 U. Alternatively, the knives are bent in a spiral shape as disclosed in U.S. Pat. No. 3,805,660. It has also been suggested to arrange trapezoidal, angled knives on knife retainers; the knife retainers extending parallel to the axis of rotation of the cutterhead in order to achieved a pull-through cut as disclosed in U.S. Pat. No. 5,544,826, which is herein incorporated by reference. A cutterhead having knife retainers extending parallel to the axis of rotation of the cutterhead and cutting edges of the knives is described for example in DE 27 37 684 A. The knife retainers perform a so-called straight or chopping cut.

One disadvantage of a pull-through cut is that a force component develops that pushes the material to be cut out of the opening formed by the cutting edge of the knife and the edge of the shear bar, which act like scissors. The problem of material to be cut pushing out of the cutting elements increases with increasing size of the pulling angle. It also increases with the position of the knife's tapered cutting edge with respect to the direction of rotation or the edge of the shear bar, with further rounding of the cutting edges and the shear bar edges due to wear, and with decreasing coefficients of friction for the material to be cut, particularly if the moisture content of the material to be cut changes. If the material to be cut is automatically transported between the shear bar's edges and the knives' cutting edges that are disposed at an angle to the direction of rotation and retained there, this action counteracts the outward push of the material. If this forced feed and fixation of the material does not exist, then the material to be cut may escape the pushing force by moving sideways. In this configuration, the material is only partially cut or not at all. Consequently, the true mean length of the cut material shift towards a greater mean length of cut in the chopped pile at constant feed speeds, i.e. at lengths of cuts that are set to a constant length.

Despite the above-described problem, the pull-through cut has been widely used over the last few decades since it achieves good cutting results in many crop types, such as corn. In other crop types, such as grass, its cutting results are frequently less satisfactory. Replacing the cutterhead in an embodiment having both knife retainers and cutting edges extending parallel to the axis of rotation can be difficult.

SUMMARY

The above and other objects and advantages of this invention will become apparent to a person of ordinary skill in this art upon a careful reading of the detailed description of this application including the drawings as presented herein.

In view of the above and other drawbacks and limitations, it is an object of the invention to provide a cutterhead that can be easily switched from a pull-through cut mode to a chopping cut mode, wherein the pull-through cut mode also includes knives that are relatively easy and inexpensive to manufacture and maintain.

The cutterhead includes a closed or open surface that is rotated about the cutterhead's axis of rotation during operation. Knife retainers are disposed on this surface at a longitudinal axis defining an angle (between 0° and 90°) with respect to the axis of rotation. The knife retainers provide an attachment for a fastening region of a knife. The knife includes a fastening region, a separating region and has formed thereon a cutting edge. If flat knives having a cutting edge that extends parallel to the fastening region are fastened to the knife retainers, the conventional pull-through cut is obtained. The shape of at least one knife is configured such that the cutting edge extends parallel to the axis of rotation of the cutterhead to define a chopping cut mode.

A straight cut can be obtained with a cutterhead equipped with inexpensive flat and rectangular knives that are easy to manufacture and use. The cutterhead can be adapted quickly and easily to harvest different types of crops. In the case of a straight cut, in the chopped pile, the amount of chopped pieces having a greater length than that length defined by the specified design and operating parameters is reduced, as compared to the pull-through cut. Accordingly, this results in a more accurate length of cut distribution, with fewer excess lengths and hence to a better cutting or chopping quality of the overall chopped pile. The more even length distribution of the chopped pieces in the chopped pile with fewer excess lengths also has a positive effect on subsequent processes, such as the density of chopped crop achieved in the silo in order to ensure good silage quality, or on the mixing of the chopped crop with other materials. The cutting edges of the knives do not have to be specially configured since the material to be cut is not pushed out by the inclined position of the cutting edges. After the cutting edges have become rounded due to the typical wear this significantly simplifies the restoration of the sharpness of the knives by grinding.

Another advantage is that knife retainers disposed at an angle in relation to the axis of rotation may be combined with existing cutterheads and likewise with existing and series-produced angled knives, which are currently used in cutterheads with knife retainers oriented parallel to the axis of rotation, so as to obtain a straight cut.

A knife, according to the present invention, that is suited for achieving a chopping cut is characterized in that the separating region plane (the plane in which the separating region of the knife extends) and the fastening region plane (the plane in which the fastening region extends) define such an angle that the separating region plane extends substantially parallel to a tangent of the surface of the cutterhead. Additionally, the distance between the cutting edge and the fastening region plane, on the side of the knife which comes in contact with the side of the knife retainer leading in the direction of rotation of the cutterhead, is shorter than the corresponding distance at the other end (the side of the knife that comes in contact with the side of the knife retainer trailing in the direction of rotation of the cutterhead).

BRIEF DESCRIPTION OF THE DRAWINGS

These and other features and advantages of the present invention will be better understood by reference to the following detailed description when considered in conjunction with the accompanying drawings. The drawings illustrate two embodiments of the invention, which are described in more detail hereinafter, wherein.

DETAILED DESCRIPTION

Figure 1:
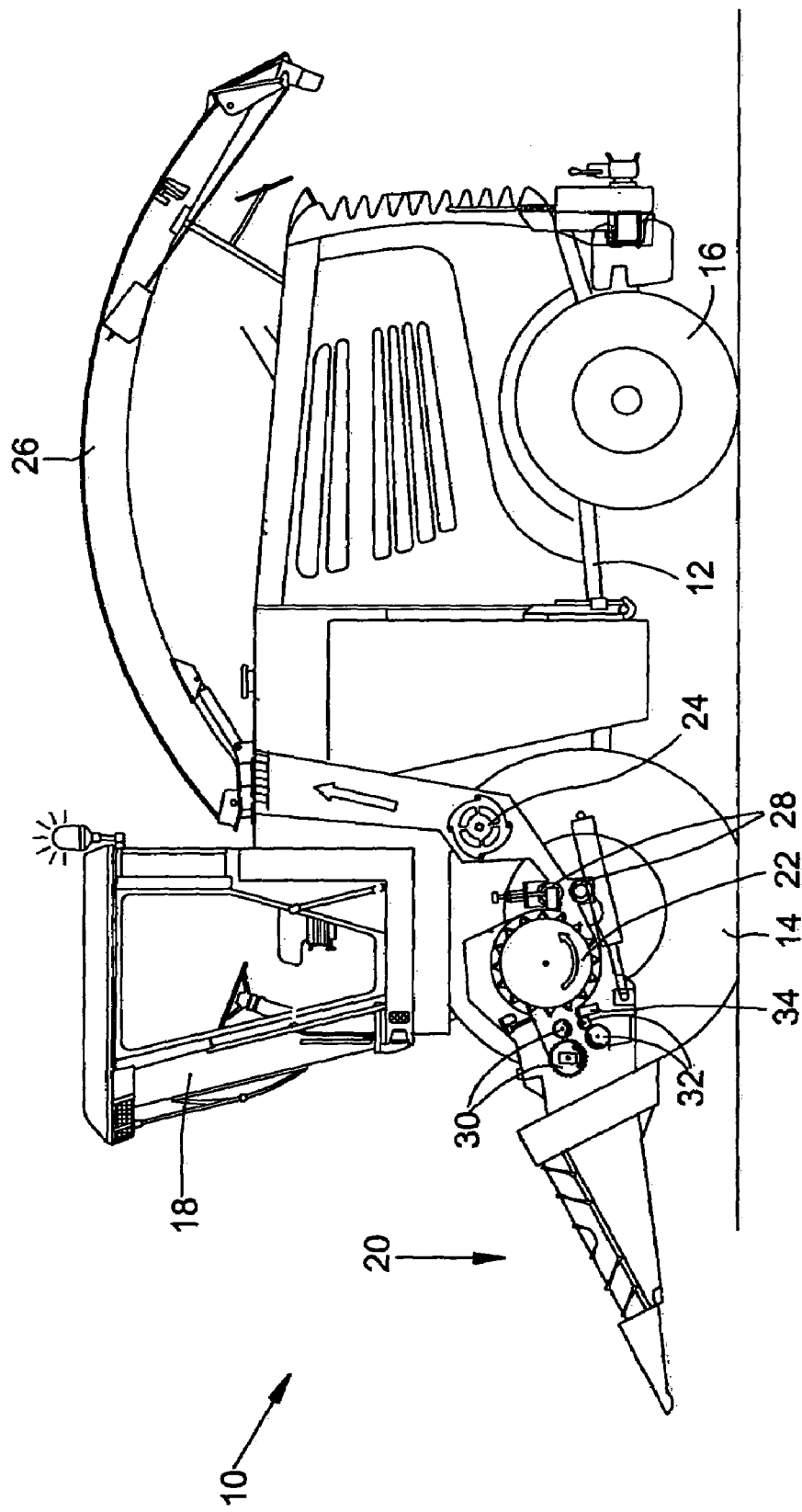
FIG. 1 shows a forage harvester comprising a cutterhead.

Referring now to the drawings, FIG. 1 shows a harvester 10 in the form of a self-propelled forage harvester. The harvester 10 rests on a frame 12, which is carried by driven front wheels 14 and steerable rear wheels 16. The harvester 10 is operated from a driver's cab 18, from where a harvesting header 20, suited for the harvest of stem-like plants, can be viewed. By means of the harvesting header 20, which in the illustrated version is a corn or maize header operating independently from the rows, crop picked up from the ground (e.g. corn, grain or the like) is fed through upper pre-compression rollers 30 and lower pre-compression rollers 32 to the cutterhead 22, which interacts with a shear bar 34 in order to chop or shred the picked-up crop into small pieces and send it to a conveying device 24. The chopped crop leaves the harvester 10 and is conveyed via a position-adjustable discharge device 26 into a trailer traveling alongside or behind the harvester 10. Between the cutterhead 22 and the conveying device 24, is a post-shredding device 28 through which the crop is fed tangentially to the conveying device 24.

The cutterhead 22 includes a drum having a closed, jacket-like surface 36 that is connected through side walls 40 to a rotatable shaft defining a coaxial axis of rotation 38. Distributed across the surface 36 of the drum are roof-shaped knife retainers 42. The knife retainers 42 are oriented with regard to the drum such that their longitudinal extension defines an angle a of about 100 with the axis of rotation 38. A trailing surface 46 of the knife retainers 42 (trailing in the direction of rotation of the cutterhead 22, which runs in the direction of the arrow 44) has bores 48 incorporated therein and through which screws 50 extend for the purpose of fastening the knives 52 to the retainers 42. The screws 50 are inserted from the outside through holes in pressure plates 54, through slots 56 in fastening regions 58 of the knives 52, through the bores 48 in the retainers 42 and into threaded plates 59 located on the underside of the knife retainers 42 and which serve to fasten the knives 52 to the knife retainers 42.

Figure 2:
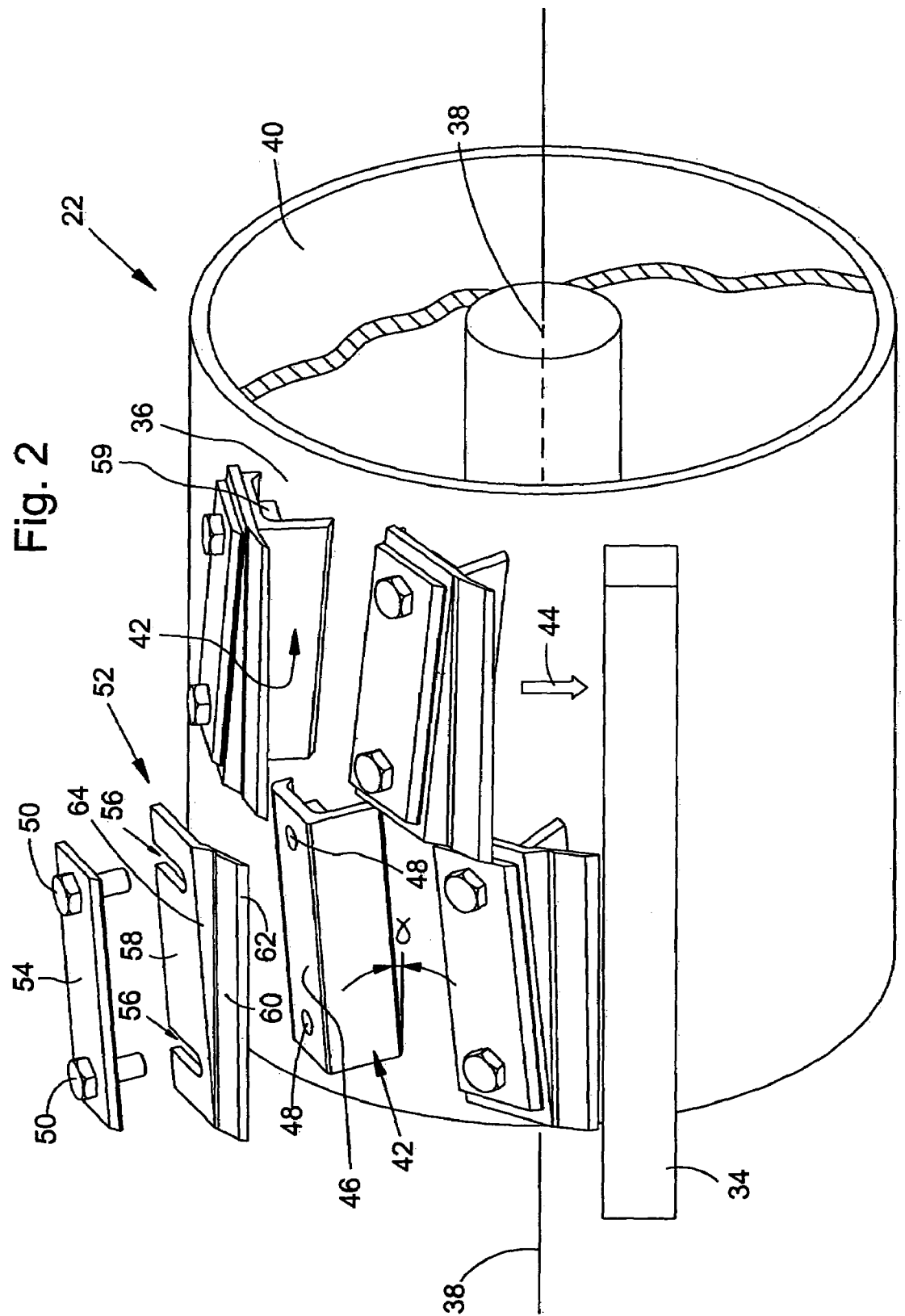
FIG. 2 is a perspective, partially exploded view, of the cutterhead and the knife from the front.

As shown in FIG. 2, the fastening region 58 of the knives 52 defines an angle corresponding to angle α. When viewing the knife 52 from above, the knife 52 is seen to include a separating region 60 blending into a cutting edge 62. The separating region 60 is positioned in a separating region plane generally spaced inward, in the direction of the axis of rotation 38, in relation to a fastening region plane of the fastening region 58. The knife 52 is thus "twisted" between the separating region 60 and the fastening region 58. Between the fastening region 58 and the separating region 60, a generally S-shaped curvature or off-set region 64 is provided having two curvatures or bends shaped in opposite directions. FIG. 2 further illustrates that the curvature region 64 is generally triangular (wedge-shaped) so as to achieve the angle α in the fastening region 58. The separating region plane 74 is defined such that it is oriented substantially parallel to a tangent 76 to the surface 46 of the drum.

The above described shape of the knives 52 allows the cutting edge 62 to be positioned parallel to the axis of rotation 38. This way a chopping cut is accomplished, which is better suited for some types of crop than a pull-through cut.

Figure 3:
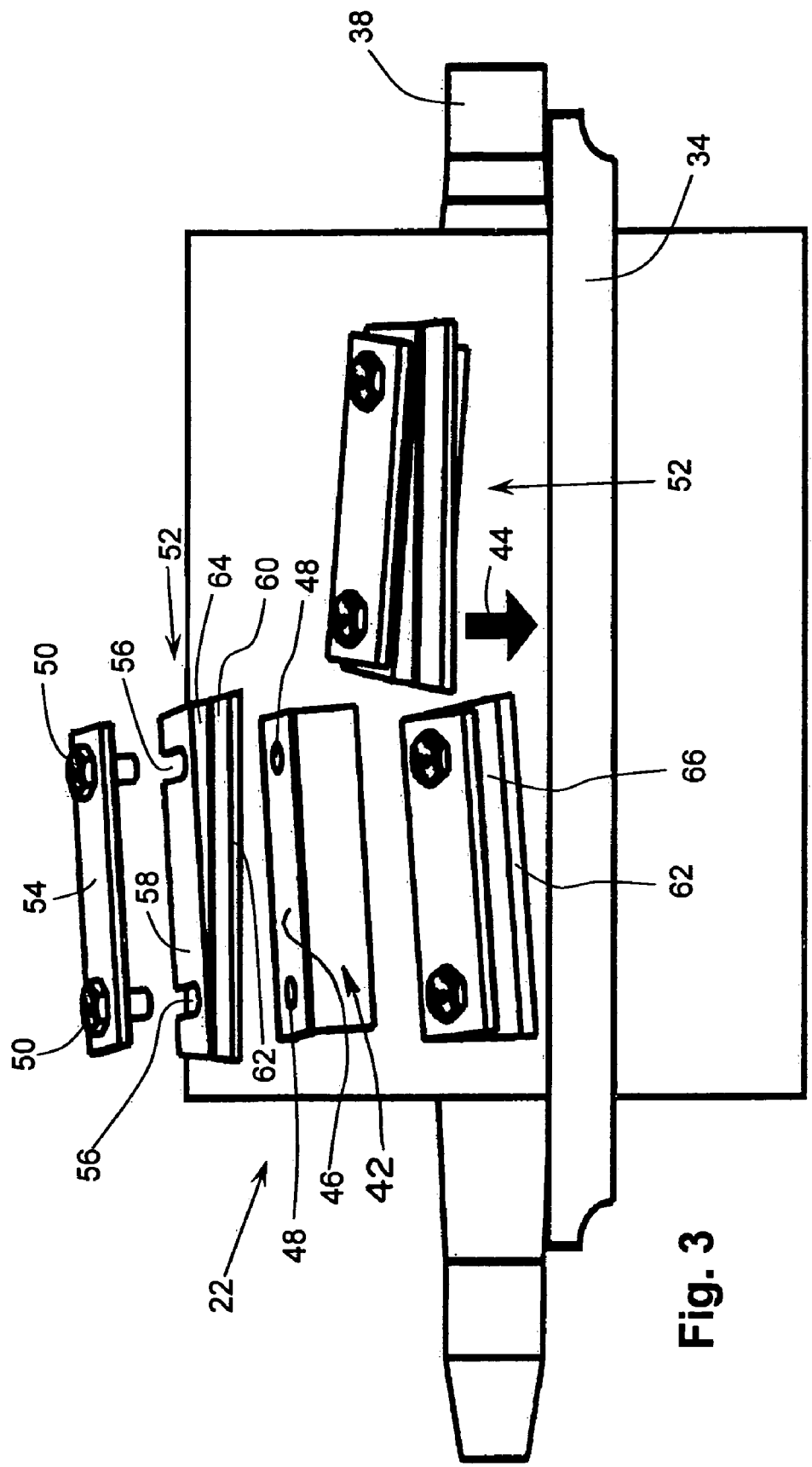
FIG. 3 is a front view of a second embodiment of a cutterhead.

It is also feasible to dispose both kinds of knives (parallel and angle cutting edges) in a mixed fashion on the cutterhead 22. The above described knives 52 with their chopping cut can be alternated or otherwise mixed with flat, rectangular knives 66 having cutting edges 62 running parallel to the fastening region (and therefore angle with regard to the axis of rotation and shear bar) so as to achieve a pull-through or shearing cut, as illustrated in FIG. 3. It is also conceivable to arrange knife retainers on a cutterhead so that the knife retainers are alternately parallel to the axis of rotation and at an angle to the axis of rotation. In such a construction, the alternating knife retainers can be equipped with identical knives, which are either rectangular and flat or, as described above, or that are angled or twisted between the fastening region and the separating region so as to define an angle between the fastening region and the separating region (in the top view). The effect, however, would be to have both types of cutting actions on the same cutterhead.

Figure 4:
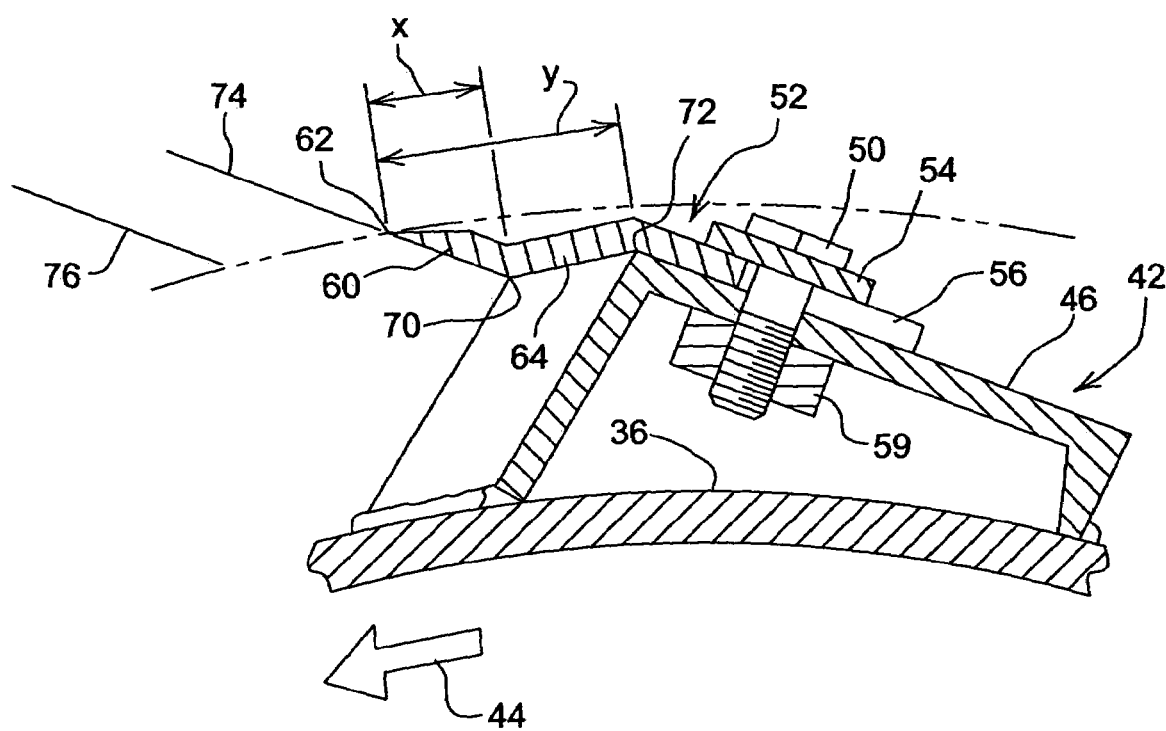
FIG. 4 is a cross-sectional view of the knife retainer and knife of FIG. 2.

Referring now to FIG. 4, seen therein is a cross-sectional view of one of the knife retainers 42 and knives 52 of FIG. 2. As readily seen therein, the distance "x" from the cutting edge 62 to the leading portion 70 of the knife retainer 42 is shorter than the distance "y" from the cutting edge 62 to a trailing portion 72 (in the direction of rotation 44) of the knife retainer 42. Also, the separating region plane 74 is seen as extending substantially parallel to a tangent 76 of the surface 36 of the drum.

It should be understood, and therefore included within the scope of this invention, that the various elements of the described embodiment can be replaced with a wide variety of different mechanisms or devices including, automated or manual devices. While the principles of the present invention have been more clear in the illustrated embodiments, it will be immediately obvious of those skilled in the art that many modifications of structure, arrangement, proportions, the elements, materials and components used in the practice of the invention and otherwise, which are particularly adapted to specific environments without departing from those principles. The following claims are intended to embrace and cover any and all such modifications with the limits only of the true spirit scope of the invention.

The invention claimed is:

1. A cutterhead, comprising:

a drum defining an axis of rotation and having and outer surface spaced about the axis of rotation;

knife retainers disposed about the outer surface, the knife retainers having a longitudinal extension being non-parallel to and defining an angle (a) with respect to the axis of rotation; and at least one knife mounted to one of the knife retainers and having a fastening region attached to the knife retainer and a separating region forming a cutting edge, the cutting edge being configured such that the cutting edge of the knife extends parallel to the axis of rotation.

2. The cutterhead of claim 1 wherein the fastening region of the knife extends in a fastening region plane and the separating region of the knife extends in a separating region plane, the separating region plane being different than the fastening region plane.

3. The cutterhead of claim 2 wherein the separating region plane defines an angle with the fastening region plane such that the separating region plane extends generally parallel to a tangent of the outer surface of the cutterhead.

4. The cutterhead of claim 2 wherein a first portion of the cutting edge is located a first distance from a first portion of the knife retainer leading in the direction of rotation of the cutterhead, and a second portion of the cutting edge is located a second distance from a portion of the knife retainer portion leading in the direction of rotation of the cutterhead, the first distance being shorter than the second distance.

5. The cutterhead of claim 1 further comprising at least one second knife mounted to another of the knife retainers, the second knife including a cutting edge being configured such that the cutting edge of the second knife extends at the angle $\alpha$ with respect to the axis of rotation.

6. The cutterhead of claim 5 wherein a plurality of second knives are alternatingly mounted to the knife retainers.

* * * * *